Figure 1:
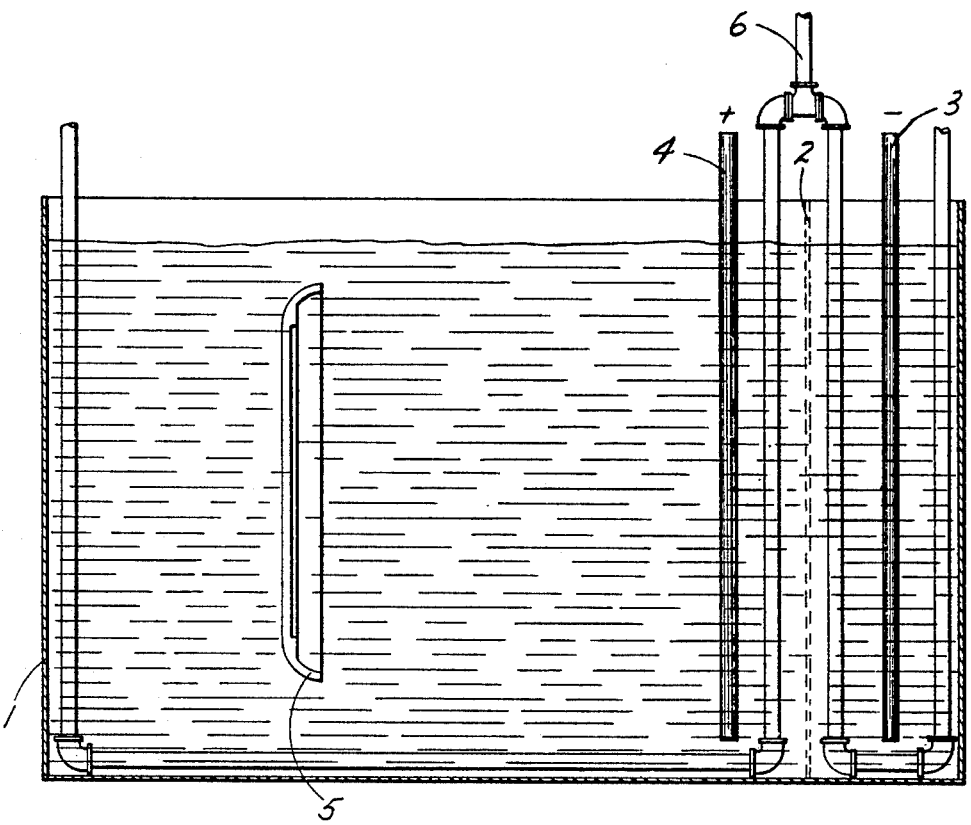

May 23, 1933.  F. K. BEZZENBERGER  1,910,277
METHOD OF CLEANING VULCANIZING MOLDS
Filed July 5, 1932

Inventor
FREDERICK K. BEZZENBERGER.
By
Richey & Watts
Attorney

Patented May 23, 1933

1,910,277

UNITED STATES PATENT OFFICE

FREDERICK K. BEZZENBERGER, OF CLEVELAND, OHIO

METHOD OF CLEANING VULCANIZING MOLDS

Application filed July 5, 1932. Serial No. 620,812.

This invention relates to the art of removing the films of rubber containing material which adheres to molds used in vulcanizing rubber articles. More particularly, it relates to the use of powerful oxidizing agents, such as chemicals which have the property of disintegrating the adhering film and removing it from the molds. The invention also relates to the rejuvenation of the chemicals employed to remove the film.

Heretofore the film of rubber containing material which adheres strongly to molds, especially metal molds used in vulcanizing rubber articles, has been removed by the application of a flame to the film and resultant burning of the latter. This method is tedious and expensive and may injure the molds.

According to the present invention, I am enabled to remove this strongly adhering film from metal molds in a simple, cheap and expeditious manner. This method involves, broadly speaking, the subjection of the film to a solution containing one or more suitable chemicals capable of chemically oxidizing the binding material in the film in such a manner as to result in substantially complete disintegration of the film, and, consequently, removal thereof from the mold or mold parts. I believe the chemical reaction which takes place by this method is essentially an oxidizing action with oxidation of the rubber parts of the film which bind or hold together the fillers or other material therein, and that the rubber is more or less completely oxidized into carbon dioxide and water, since little or no rubber residue remains after this treatment.

As illustrative of chemicals which have the foregoing properties, I mention chromic acid, potassium dichromate, the various chlorates, perchlorates and peroxides, particularly sodium peroxide and hydrogen peroxide. These various substances vary somewhat in their rapidity of action, in their cost and in the matter of their recovery after such use. Accordingly, I prefer to use chromic acid with or without other chemicals, for its first cost is not exorbitant and it may be recovered or rejuvenated and repeatedly used without substantial loss or deterioration.

As a specific example of the manner in which I may carry out the present process, I may state that a solution of chromium trioxide in water to the extent of a concentration of about 50% and at a temperature of about 210° F. will, within a short time, for example about fifteen minutes, remove from a mold substantially all the film material adhering thereto, after which the mold may simply be rinsed in water, dried, and again used for vulcanization.

Obviously, different concentrations than the foregoing may be employed, and I have found that the film material may be removed with water solutions of chromic acid in which the concentration ranges between about 10% and about 70%, and likewise that the temperature range within which the solution may be used may range from about 70° F. to about the boiling point,—that is to about 225° F. I do not wish, however, to limit myself to any particular concentration, inasmuch as relatively low concentrations may under certain conditions be quite satisfactory, while under other conditions concentrations approaching the saturation point may be advantageous. When increased acid activity of the solution is desired, the concentration should be correspondingly low, because the acid activity of an acid body is inversely proportional to the concentration. On the other hand, I believe that the oxidizing capacity of the solution is greater with the higher concentrations and accordingly I prefer to use a relatively high concentration, which, generally speaking, should not exceed that concentration at which the chromic acid crystallizes out on the top of the solution. There is danger that such crystallized chromic oxide may be lost by being removed from the bath along with the mold when the latter is being taken out for washing and drying. A chromic acid concentration of about 50% in a water solution has been found to be entirely satisfactory under most conditions.

The film, when treated as above outlined, disappears more or less in its entirety. Apparently the reaction is that of progressive elimination from the exposed surface of the film to the mold, for observations made during the progress of the process indicate a gradual thinning of the film, with final complete removal. I believe the action which takes place is that of oxidation of the rubber material in the film into such compounds as carbon dioxide and water and that the inorganic or other non-readily oxidizable materials in the film have no adherence to the mold and fall away from the mold and collect in the bath as soon as the binding material has been oxidized or otherwise dissipated and removed. Inorganic and other foreign and non-readily oxidizable materials do collect in the bath as a result of this process.

I may add other chemicals to the chromic acid solution to enhance the rate of the reaction, or for other reasons. For example, I may add sulphuric acid and/or potassium dichromate or other oxidizing agents or catalytic agents.

I have also found that the speed of the reaction of the chromic acid may be increased by making the mold part to be cleaned the anode in an electric circuit in which the solution forms the electrolyte, while separating the cathode and anode compartments by a suitable diaphragm. I have found that the chromium trioxide or chromic acid which is employed in cleaning molds as aforesaid, may be reduced during the cleaning operation to chromium chromate. This compound may be reoxidized to chromium acid by any one of several different methods. For example, it may be oxidized and thus rejuvenated by treatment with hydrogen peroxide or by anodic oxidation. When the cleaning operation takes place in an electrolytic bath, the nascent oxygen liberated at the anode, whether or not the mold be the anode, serves to reoxidize any chromium chromate present to chromium trioxide or chromic acid. Obviously, the chromium chromate may be reoxidized or rejuvenated outside of the tank in which the cleaning operation is performed, and a convenient means of accomplishing this would be to treat the withdrawn solution in the anode chamber of an electrolytic bath much like that shown in the drawing and then return the rejuvenated liquid for further use in cleaning molds.

In the drawing accompanying and forming a part of this application, the figure shows diagrammatically a form of apparatus which may be used in carrying out the present process and in rejuvenating the chromic acid.

In the drawing, 1 designates a suitable tank provided with a porous diaphragm 2, a suitable cathode 3, of inactive material such as lead, an anode 4 of suitable material. The mold 5 to be cleaned may be made the anode if desired. Pipes 6 may be used to conduct heated fluids thru the bath to heat the bath liquids.

A water solution of chromic acid, with or without a small amount of sulphuric acid is placed in the anode compartment of the tank 1, and a solution of a suitable material, such as caustic soda is placed in the cathode compartment, and both are heated to the desired temperature. The chemical reaction between the chromic acid and the film material proceeds independently of the electrical current until substantially all the film material has been disintegrated and removed from the mold. During this action the chromic oxide may be in part reduced to chromium chromate. When current is flowing the chromium chromate is reconverted into chromic acid by the nascent oxygen liberated at the anode. Substantially the same cleaning and oxidizing action takes place when the mold 5 is made the anode in the electrolytic bath, and the cleaning action is thus expedited by the oxygen liberated electrolytically at its surface.

The voltage and amperage of the current employed may vary over a wide range, but should be used in accordance with well known electrochemical principles. Generally speaking, the current will vary depending on the size of the apparatus, the volume of liquid and the desired speed of reaction.

In the event that the molds to be cleaned contain interstices in which the presence of any chromic acid is objectionable, the molds may, after having been cleaned, be dipped or rinsed in a solution of a suitable substance such as barium hydroxide which will neutralize the effect of or react with the chromic acid as in forming in the interstices an insoluble salt. The chromic acid not only acts to remove the film from the mold, but exerts an oxidizing action on the mold surfaces and hence renders the molds, particularly when made of aluminum alloys, more resistant against corrosion.

Since the mold will carry with it some chromic acid when removed from the bath, it is desirable to recover this acid. The mold with the acid on it may be rinsed with water and the acid and this rinse water may be returned to the bath. Since the temperature of the bath is preferably maintained quite high, the rinse water will rapidly evaporate and will not materially dilute the acid in the bath.

Having thus described my invention so that those skilled in the art may be able to practice the same, what I desire to secure by Letters Patent is defined in what is claimed.

What is claimed is:

1. The method of cleaning metal articles having a rubber containing film adhering thereto, which includes the steps of exposing such a film to a solution containing chromic acid with other chemicals in an amount sufficient to oxidize chemically the binding material of the film, thereafter rinsing the mold.

2. The method of removing a film of rubber containing material adhering to a mold in which rubber articles have been vulcanized, which comprises subjecting the film to a liquid containing chromic acid in an amount between about 10% and about 70% concentration for a sufficient time and a sufficient temperature for substantially complete oxidation of the binding material of the film to take place with disintegration of the film, and then removing the mold from the contact with the liquid and rinsing and drying the mold.

3. The method of removing a film of rubber containing matter adhering to a mold in which rubber articles have been vulcanized, which comprises subjecting the film to a liquid containing chromic acid amounting to between about 10% and about 70% concentration and at a temperature of between 70° F. and about 225° F. until the binding material of the film has been substantially disintegrated, and then removing the mold from contact with the liquid and rinsing the mold.

4. The method of removing film of rubber containing material adhering to a mold in which rubber articles have been vulcanized, which comprises subjecting the film to a liquid containing chromic acid to the extent of about 50% concentration at a temperature of about 210° F., until the film has substantially disintegrated, and then removing the mold from the liquid and rinsing the mold.

5. The method of cleaning metal articles having interstices and having a rubber containing film adhering to the mold, which comprises the steps of subjecting the film to a solution containing chromic acid in an amount between about 10% and 70% concentration and in such manner as to cause substantially complete oxidation of the binding material of the film, with resultant disintegration of the latter, rinsing the mold and then exposing the liquid remaining in the interstices of the mold to a solution capable of neutralizing the effect of the liquid in said interstices.

6. The method of cleaning metal molds having a film of rubber containing material adhering thereto as a result of vulcanization, which comprises subjecting the film to a liquid containing chromic acid to the extent of between about 10% and 70% concentration at a temperature between about 70° F. and 225° F. until the film has substantially disintegrated, and rejuvenating the chromic acid by subjecting the liquid to oxidation.

7. The method of removing the film of rubber containing matter adhering to the molds in which rubber articles have been vulcanized, which comprises disintegrating the film by exposing it to a solution containing a sufficient amount of chromic acid to oxidize chemically the binding material of the film, subjecting the liquid to anodic oxidation and then employing the thus rejuvenated chromic acid for cleaning other molds.

8. The method of removing the film of rubber containing material adhering to molds in which rubber articles have been vulcanized, which consists in subjecting the film to a liquid containing between about 10% and about 70% chromic acid, constituting the mold an anode in an electrolytic circuit of which the liquid is the electrolyte, and passing a current of electricity through the mold and electrolyte.

9. The continuous method of removing rubber containing material in the form of a film adhering to molds in which rubber articles have been vulcanized, which comprises passing current through an electrolyte containing between about 10% and about 70% chromic acid, successively bringing molds to be freed from such film into said electrolyte as anodes, and subjecting the electrolyte to anodic oxidation, thereby maintaining it in active form.

10. The method of cleaning metal molds having a film of rubber containing material adhering thereto as a result of vulcanization, which comprises subjecting the film to a liquid containing chromic acid to the extent of between about 10% and 70% concentration at a temperature between about 70° F. and 250° F. until the film has substantially disintegrated, and chemically oxidizing the chromium chromate in the liquid to chromic acid.

In testimony whereof I hereunto affix my signature this 1st day of July, 1932.

FREDERICK K. BEZZENBERGER.